US008922868B2

(12) United States Patent
Donval et al.

(10) Patent No.: US 8,922,868 B2
(45) Date of Patent: Dec. 30, 2014

(54) RESPONSIVITY ENHANCEMENT OF SOLAR LIGHT COMPOSITIONS AND DEVICES FOR THERMOCHROMIC WINDOWS

(71) Applicant: KiloLambda Technologies Ltd., Tel Aviv (IL)

(72) Inventors: Ariela Donval, Rosh Haayin (IL); Noam Gross, Kiryat Ono (IL); Eran Partouche, Petach Tiqva (IL); Doron Nevo, Ra'anana (IL); Moshe Oron, Rehovot (IL)

(73) Assignee: KiloLambda Technologies Ltd., Tel-Aviv (IL)

( * ) Notice: Subject to any disclaimer, the term of this patent is extended or adjusted under 35 U.S.C. 154(b) by 0 days.

(21) Appl. No.: 13/771,714

(22) Filed: Feb. 20, 2013

(65) Prior Publication Data

US 2013/0215490 A1  Aug. 22, 2013

Related U.S. Application Data

(60) Provisional application No. 61/706,208, filed on Sep. 27, 2012, provisional application No. 61/601,715, filed on Feb. 22, 2012.

(30) Foreign Application Priority Data

Feb. 28, 2012 (IL) .......................................... 218364

(51) Int. Cl.
| | |
|---|---|
| *G02F 1/01* | (2006.01) |
| *B32B 17/10* | (2006.01) |
| *C09K 9/00* | (2006.01) |
| *H04N 5/33* | (2006.01) |
| *B82Y 20/00* | (2011.01) |

(52) U.S. Cl.
CPC .............. *G02F 1/0147* (2013.01); *B32B 17/10* (2013.01); *C09K 9/00* (2013.01); *H04N 5/33* (2013.01); *G02F 1/0126* (2013.01); *B82Y 20/00* (2013.01); *Y10S 977/833* (2013.01)
USPC ......................................... 359/288; 977/833

(58) Field of Classification Search
CPC ........... G02F 1/01; G02F 1/0147; G03C 1/00; G02B 5/22
USPC .................. 359/288, 241, 350, 356, 359, 885; 977/833; 252/586, 583, 587; 283/87, 283/88
See application file for complete search history.

(56) References Cited

U.S. PATENT DOCUMENTS 3,279,327 A   10/1966   French
(Continued)

FOREIGN PATENT DOCUMENTS

| EP | 0608203 B1 | 6/1999 |
|---|---|---|
| WO | WO2008/087077 A1 | 7/2008 |
| WO | WO2009/156816 A1 | 12/2009 |

OTHER PUBLICATIONS

Babulanam, S. et al. "Thermochromic $VO_2$ Films for Energy-Efficient Windows." Solar Energy Materials. vol. 16. 1987. (pp. 347-363).
(Continued)

*Primary Examiner* — Tuyen Tra
(74) *Attorney, Agent, or Firm* — Nixon Peabody LLP (57) ABSTRACT

The present invention relates to an optical window-filter including a thermochromic material and a light absorbing material. An absorption of light by the light absorbing material generates heat that causes phase transformation of the thermochromic material. The present invention further relates to a filter for an infrared imaging system having detectors sensitive to radiation in an infrared transmission spectrum. The filter includes a thermochromic material and a light-absorbing material. An absorption of high-power radiation in the infrared transmission spectrum by the light-absorbing material generates heat that causes phase transformation of the thermochromic material to attenuate the high-power radiation while transmitting substantially unaffected low-power radiation in the infrared transmission spectrum.

27 Claims, 6 Drawing Sheets

(56) References Cited

U.S. PATENT DOCUMENTS

| | | |
|---|---|---|
| 3,384,324 A | 5/1968 | Drive |
| 3,512,869 A | 5/1970 | Pulmat |
| 3,711,176 A | 1/1973 | Alfrey, Jr. et al. |
| 3,743,964 A | 7/1973 | Drexhage et al. |
| 3,790,250 A | 2/1974 | Mitchell et al. |
| 3,953,110 A | 4/1976 | Charoudi |
| 3,992,628 A | 11/1976 | Karney |
| 4,099,840 A | 7/1978 | van der Wal et al. |
| 4,229,066 A | 10/1980 | Rancourt et al. |
| 4,260,225 A | 4/1981 | Walles |
| 4,261,331 A | 4/1981 | Stephens |
| 4,307,942 A | 12/1981 | Chahroudi |
| 4,401,690 A | 8/1983 | Greenberg |
| H1182 H | 5/1993 | Spry |
| 6,049,419 A | 4/2000 | Wheatley et al. |
| 6,084,702 A * | 7/2000 | Byker et al. ............... 359/288 |
| 6,172,795 B1 | 1/2001 | Carlson |
| 6,301,040 B1 | 10/2001 | Chakrapani et al. |
| 6,522,446 B2 | 2/2003 | Saxe |
| 6,597,412 B1 | 7/2003 | Buzak et al. |
| 6,606,185 B2 | 8/2003 | Saxe |
| 6,674,419 B2 | 1/2004 | Ilcisin et al. |
| 7,259,925 B1 | 8/2007 | Ahn |
| 7,973,998 B2 | 7/2011 | Xue |
| 8,044,813 B1 * | 10/2011 | Dembo et al. ............... 340/635 |
| 2005/0082480 A1 | 4/2005 | Wagner et al. |
| 2007/0068630 A1 * | 3/2007 | Griffin et al. ............... 156/387 |
| 2011/0233404 A1 | 9/2011 | Sonstroem |
| 2011/0260123 A1 | 10/2011 | Granqvist et al. |

OTHER PUBLICATIONS

Extended European search report mailed Apr. 22, 2013 which issued in corresponding European patent application No. 13156434.6 (7 pages).

Ginneton, F. et al. "Comparative Study Between Nanocrytalline Powder and Thin Film of Vanadium Dioxide $VO_2$: Electrical and Infrared Properties." Journal of Physics and Chemistry of Solids. vol. 62. Jun. 2000. (pp. 1229-1238).

Jin, P. et al. "Tungsten Doping into Vanadium Dioxide Thermochratic Films by High-Energy Ion Implantation and Thermal Annealing." Thin Solid Films. vol. 324, No. 1998. Oct. 1997. (pp. 151-158).

Kiri, P. et al. "Solid State Thermochromic Materials." Advanced Materials Letters. vol. 1, No. 2. Aug. 2010. (pp. 86-105).

Morin, F. "Oxides Which Show a Metal-to-Insulator Transition at the Neel Temperature." Physical Review Letters. vol. 3, No. 1. Jun. 1959. (pp. 34-36).

Mott, N. "Metal-Insulator Transitions." Taylor & Francis. Second Edition. 1990. (17 pages).

Pierce, J. et al. "Structure of Orthorhombic $V_{0.95} Cr_{0.05} O_2$." Physical Review B. vol. 5, No. 10. May 1972. (pp. 4104-4111).

Suh, J. Y. et al. "Semiconductor to Metal Phase Transition in the Nucleotion and Growth of $VO_2$ Nanoparticles and Thin Films." Journal of Applied Physics. vol. 96, No. 2. Jul. 2004. (pp. 1209-1213).

\* cited by examiner

Fig. 7. Transmittance hysteresis for VO$_2$ thin film.

RESPONSIVITY ENHANCEMENT OF SOLAR LIGHT COMPOSITIONS AND DEVICES FOR THERMOCHROMIC WINDOWS

CROSS REFERENCE TO RELATED APPLICATIONS

This application claims the benefit of U.S. Provisional Application No. 61/706,208, filed Sep. 27, 2012, Israeli Application No. 218364, filed Feb. 28, 2012 and U.S. Provisional Application No. 61/601,715, filed Feb. 22, 2012, each of which is incorporated by reference herein in its entirety.

FIELD OF THE INVENTION

The present invention relates to sun light or visible light power-limiting devices, and more particularly, to a solar power-limiting passive device and to a method for limiting solar power transmission in windows. Employing absorption changes in a novel thermochromic composition, the responsivity of the composition is enhanced and the reaction time of the composition is shortened when exposed to solar light in the visible, near IR (infrared) region, i.e., at wavelengths of about 0.3 to 2 micrometer ($\mu m$) wavelength region of the optical spectrum and when exposed to infrared light in the about 3 to 5 $\mu m$ and about 8 to 14 $\mu m$ region of the optical spectrum. These additional response enhancing features enable the use of the thermochromic composition in places where efficient sunlight power limiting is essential and where low infrared emitting or "cold" objects are in the presence, in close vicinity, of high infrared emitting "hot" targets or background.

The present invention further concerns, but is not limited to, the production of windows, lenses, and other optical articles. The present invention further relates to protecting dedicated optical elements against bright emitting sources, like the sun, that have most of its radiation in the visible and infrared region of the optical spectrum: at wavelengths of between about 0.3 $\mu m$ to 14 $\mu m$.

BACKGROUND OF THE INVENTION

IR imaging systems employ focal plane arrays in various cameras, having focal plane detectors that are sensitive to light at the 3-5 and 8-12 $\mu m$ ranges of the optical spectrum. The two ranges cover the two main windows in the IR transmission spectrum of the atmosphere. These systems need to be protected from dazzling and temporary or permanent damage caused by intense radiation sources in the field of view, yet the optical systems should at the same time be completely transparent at these wavelengths for low light power. The intense radiation sources may be of two kinds; first, coherent lasers in the spectral region, continuous or pulsed, and second, non-coherent sources like explosions, field-fire or hot substances in the field of view.

SUMMARY OF THE INVENTION

Since the spectral emission of the hot and cold targets reaching the IR sensor are in the same spectral wavelength region, enhancing the ability to see cold targets can only be achieved by selective control of transparency in which bright light sources are attenuated while weak light sources are not affected. This can be done using a non-linear spatial filter, positioned, e.g., at the focal plane of an imaging system, which attenuates the hot areas in the picture and transmits unaffected the cold parts of the picture, thus expanding its dynamic range. Some aspects of the present invention enable better visibility of low infrared emitting cold targets in the presence, in close vicinity, of high infrared emitting hot targets or background.

Some similar problems for visible light cameras are solved using image processing of the stored picture. Unfortunately, this approach does not work effectively in the IR windows, since saturation effects hinder the operation of the whole focal plane array sensor. Thus, a novel approach is needed for the visible and IR regions combined together in a single window, or when separated into two windows, one for the visible and the other for the IR.

In the phenomenon of thermochromism the optical properties of a material change reversibly as a function of temperature. There are various types of thermochromism. Of special relevance is thermochromism exhibited in the semiconductor-to-metal transition by solid-state materials, such as vanadium and titanium oxides. These can be used in the extreme environmental conditions needed.

A particular case of interest is vanadium dioxide since its transition temperature Tc is close to room temperature. Observations and current understanding of the nature of the semiconductor-to-metal transition exhibited by these materials is known and reported in the literature as seen for example in Pragna Kiri et al., "Solid state thermochromic materials," Adv. Mat. Lett. 2010, 1(2), 86-105, the disclosure of which is incorporated entirely herein by reference. The possibility of fine-tuning the transition temperature by introducing various dopants into the, e.g., vanadium dioxide lattice is a phenomenon which was extensively studied and examined as seen for example in P. Jin et al., "Tungsten doping into vanadium dioxide thermochromic films by high-energy ion implantation and thermal annealing," Thin Solid Films 324, 1998, 151-158, the disclosure of which is incorporated entirely herein by reference.

Typically, the thermochromic effect occurs over a range of temperatures and it is observed as a gradual color change, i.e., continuous thermochromism. Discontinuous thermochromism involves a structural phase change at the transition temperature. This phase change can be first or second order in nature, and may be reversible or irreversible, as governed by the thermodynamics of the system as explained for example in N. F. Mott, Metal-Insulator Transitions, second edition (Taylor & Francis, London, 1990).

Transition-metal oxides such as $Ti_2O_3$, $V_2O_3$, $VO_2$, and VO are all semi-conducting at low temperatures and show a transition into a metallic state at the Tc temperature. The electrical properties of these oxides were thoroughly studied using thermo-conductive studies by Morin, F. J. Phys. Rev. Lett. 1959, 3, 34-36. It was discovered that all lower oxides of titanium and vanadium exhibit this behavior except for TiO, which is metallic over the entire temperature range.

Vanadium dioxide is by far the most studied solid state thermochromic material. It shows great promise for applications such as "intelligent" architectural glazing. A single pure crystal of $VO_2$ has a semiconductor-to-metal transition temperature of 341K (68° C.). There is a corresponding structural phase change upon passing Tc, from the low temperature monoclinic crystal structure to the high temperature rutile, tetragonal-type lattice. The phase change alters the optical properties of $VO_2$. In the semiconductor phase it is mostly transparent, in the relevant part of the spectrum, while the transition to metal makes it opaque as explained in S. M. Babulanam et al., "Thermochromic $VO_2$ films for energy efficient windows," Solar Energy Materials 16 (1987) 347-363.

Critical temperature Tc of 68° C. is too high to be effective in many applications. For example, the ideal transition temperature for "intelligent" glazing is in the region of about 18-25° C. Dopants can be incorporated into $VO_2$ to increase or decrease its Tc, in order to make the $VO_2$ more commercially viable as explained in Pierce, J. W.; Goodenough, J. B. Physical Review B 1972, 5(10), 4104. Tungsten reduces Tc of $VO_2$ and there are a number of other dopants that can be incorporated into vanadium oxide to reduce its Tc.

Rare earth nicklates with the general formula $RNiO_3$, where R is a rare earth element, exhibit a metal-insulator transition at temperature of 130K (−140° C.), 200K (−70° C.), 400K (130° C.) and 560K (290° C.) for R=Pr, Nd, Sm and Gd, respectively. The transition temperature decreases with increasing size of the rare earth ion. The nicklates are good candidates for non-linear filters.

Some prior patents include $VO_2$ solid layers as a filter. U.S. Patent Application No. 2011/0233404A1, the disclosure of which is incorporated herein by reference in its entirety, relates to an optical switch-window for an uncooled focal plane array camera for the IR region, using thermochromic-optical-switch-window coated with crystalline thin layer of vanadium oxide. Previously, it was shown in U.S. Pat. No. 7,259,925, the disclosure of which is incorporated herein by reference in its entirety, that a layer of $VO_2$ would generally protect infrared sensors in a Forward Looking Infrared imager (FLIR) against radiation from high power lasers. However, the patent does not disclose how the layer should be incorporated in an uncooled sensor, or how it can be designed to block radiation that is less intense than lasers, such as sunlight, explosion or fire.

The relation between the size of thermochromic particle and the transition properties of individual nano-crystals has been demonstrated and is currently extensively studied. The collective response of $VO_2$ nanoparticles can be related to small size effects, where most of the atoms are in close proximity to the external matrix and not to $VO_2$ lattice, and the properties of opto-electronic devices can be tuned by the size and the arrangements of single domains or single nano-particles as explained in J. Y. Suh et al., "Semiconductor to metal phase transition in the nucleation and growth of $VO_2$ nanoparticles and thin films," J. Appl. Phys., Vol. 96, No. 2, 15 Jul. 2004, the disclosure of which is incorporated entirely herein by reference. The optical properties of the oxide are also greatly affected by the transition. The properties of the transition in such systems are partially dictated by the size of the individual domains, e.g. small size $VO_2$ particles are expected to have a wider hysteresis. Indeed, optical hysteresis loops with a width as large as 50° C. have been observed for isolated $VO_2$ nanoparticles. The collective properties of nano-crystals can be tuned by controlling their size and their arrangement. Properties of individual nano-crystals open the possibility to design devices which have unique characteristics.

It was shown that nanotechnology techniques can be used to adjust the threshold value of $VO_2$ networks by controlling the size and the arrangement of the nanocrystals. This is a perfect example to show how the properties at the nano scale can lead to devices with unique characteristics that are not found in the bulk material as explained in F. Guinneton et al., "Comparative study between nanocrystalline powder and thin film of vanadium dioxide $VO_2$: electrical and infrared properties," Journal of Physics and Chemistry of Solids 62 (2001) 1229-1238.

Some aspects of the present invention relate to a novel approach, based on a passive, non-linear filter for the solar radiation spectrum, visible and the IR region, attenuating the solar light when it is hot and transmitting the solar light when it is cold and attenuating the hot areas in the picture and transmitting unaffected the cold parts of the picture. The filter is adapted to block lasers and lower power light sources, like sun light and fire or explosive light burst as well as hot background. Reactions in the filter are improved by employing methods to enhance the light intensity modulation and shorten reaction time of the thermochromic materials.

One aspect of the present invention relates to an optical power-limiting window, and more particularly, to an optical power-limiting passive device and to a method for limiting optical power transmission in windows. Using absorption changes, in a novel thermo chromic composition having enhanced response, the nonlinearity is enhanced and the reaction time is shortened when exposed to solar light in the visible and near IR (infrared) region, 0.3 to 2 micrometer wavelength region of the optical spectrum and when exposed to infrared light in the 3 to 5 and 8 to 14 micrometer wavelength regions of the optical spectrum. These additional response enhancing features enable the use of the thermo-chromic composition in solar light limiting windows and in places where low infrared emitting or "cold" objects are in the presence, in close vicinity, of high infrared emitting "hot" targets or background.

A further aspect of the present invention relates to an optical window-filter including a thermochromic material and a light absorbing material. An absorption of light by the light absorbing material generates heat that causes phase transformation of the thermochromic material.

Another aspect of the present invention relates to a filter for an infrared imaging system having detectors sensitive to radiation in an infrared transmission spectrum. The filter includes a thermochromic material and a light-absorbing material. Absorption of high-power radiation, e.g., higher than about 0.2 Joule/cm$^2$ in the infrared transmission spectrum by the light-absorbing material generates heat that causes phase transformation of the thermochromic material to attenuate the high-power radiation while transmitting substantially unaffected low-power radiation, e.g., lower than about 0.02 Joule/cm$^2$ in the infrared transmission spectrum.

BRIEF DESCRIPTION OF THE DRAWINGS

The invention will now be described in connection with certain preferred embodiments with reference to the following illustrative figures so that it may be more understood. With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention.

DETAILED DESCRIPTION

Despite the remarkable utility potential of thermochromic materials, their practical uses have been extremely limited. The limitations are largely attributed to the difficulties in providing thermochromic materials that react in low temperatures in the region of 18-25° C. Here we introduce a novel Thermochromic Composition (TCC) containing two kinds of nanoparticles (about 1 to 100 nanometers in size), embedded in a transparent matrix, where one kind of nanoparticle is thermochromic, e.g., $VO_2$ nanoparticles, and the second kind is light absorbing nanoparticles (1 to 100 nanometers in size) that exhibit strong absorption of the impinging light, e.g., carbon nanoparticles. This combination enhances and accelerates the heating of the neighboring thermochromic particles by the sun-light absorbing nanoparticles and lead to a phase transformation in the TCC at a lower impinging sun-light intensity than needed for matrices including only thermochromic materials, thus enabling the limiting of the solar light intensity by absorption in the hot thermochromic particles. When the environmental temperature is high, the TCC will start limiting at low solar power, and when the environmental temperature is low, the TCC will start limiting at higher solar power, thus enabling to preserve passively the optimal room temperature when windows of this kind are used in directions exposed to the sun.

The matrix in the TCC can be organic-based, e.g., a polymer film, a polymerizable composition, a transparent adhesive, or inorganic-based, e.g., mineral glass, sol-gel, and any other window materials, and also an inorganic-organic composite. Since the whole thickness of the composition is much less than the light wavelength, even a composition that is opaque in bulk materials is transparent in the sub wavelength thickness.

Specific embodiments utilize various TC nanoparticles and combinations of TC nanoparticles in the TCC, such as rare earth nicklates with the general formula $RNiO_3$, where R=Pr, Nd, Sm or Gd, or any combination thereof, or transition-metal oxides such as $Ti_2O_3$, $V_2O_3$, $VO_2$, and VO, or any combination thereof.

Various absorption enhancing materials can be used in the TCC to enhance light absorption from the impinging external light. Examples include, but are not limited to, carbon nanoparticles, metallic or organic nanoparticles, hollow-shell nanoparticles, rice-like nanoparticles, nonconcentric-nanoshell nanoparticles, crescent-moon-structured nanoparticles, nanoshells composed of layers of metal or carbon.

Addition of a third kind of particles to the TCC matrix, nanoparticles that are thermal conductivity enhancers, can be used to enhance the thermal conductivity of the matrix. The three component TCC compositions effectively achieve two purposes; first, heat that builds up in the optical element during the absorption of light can dissipate more easily to other elements in the system, effectively reducing the thermal degradation of both the organic material and the TCC matrix. Second, most TC materials have a hysteresis behavior with a temperature range of up to tens of degrees between Tc of heating up and Tc of cooling down, thus removing the heat fast, by using thermal conductivity enhancers, will reduce the recovery time to transparency after exposure to strong sun light radiation.

In one specific embodiment, the thermal conductivity of matrices is achieved by the addition of nanoparticles, nanorods, nanowires, hollow nanoparticles, core-shell nanoparticles, spiked particles, and nanoparticles with various shapes. These may include nanoparticles of metal, metal oxide, metal nitrides, metal carbides, metal sulfides, and carbon-based nanomaterials, such as nanodiamond, diamond-like carbon (DLC), single-wall carbon nanotubes, double-wall carbon nanotubes, multiwall carbon nanotubes, and their functionalized forms like graphene. The various compositions can be polymerized, cured or fabricated in the form of nanoparticles and/or microparticles. The nanoparticles and/or the microparticles can be further dispersed in a new matrix, appropriate for forming a window.

In one specific embodiment, the light absorbing, the TC and the thermal conductivity particles can be placed each in adjacent nano-layers, each containing one or more kinds of particles.

Figure 1:
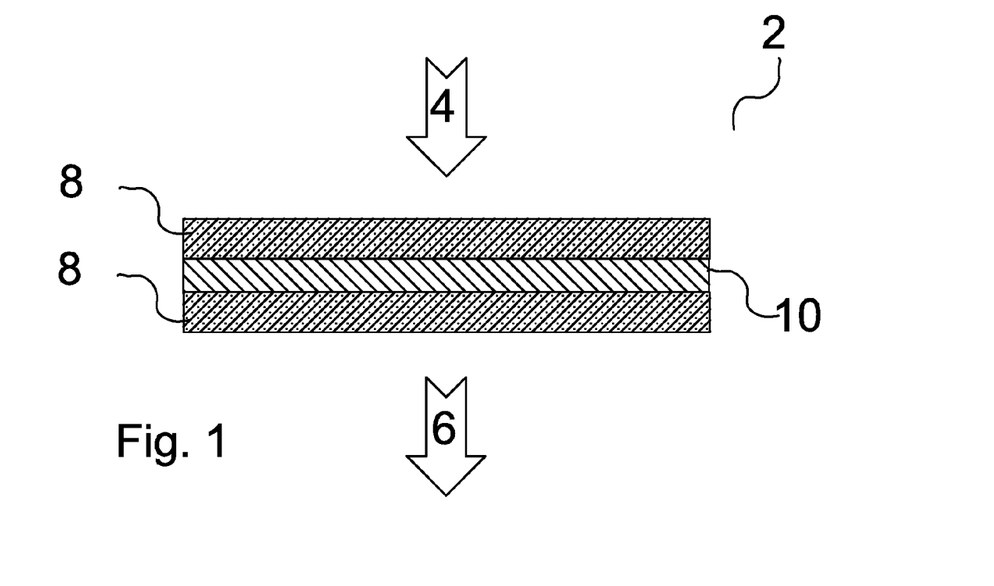
FIG. 1 depicts a cross-sectional view of a thermo-chromic bulk material window-filter.

FIG. 1 depicts a cross-sectional view of a thermochromic bulk material window-filter 2. Solar light 4 enters the filter 2 through a transparent plate of light transmitting material 8, e.g., glass slab, and impinges on a layer of thermo-chromic solid material 10. In case the material 10 is, e.g., $VO_2$, when the impingement spot is cold, less than Tc, the light passes through nearly unaffected in direction 6. When the impingement spot is hot, from Tc and up, the light is strongly affected, most of it, (e.g., more than about 60%) is absorbed in the layer 10. The filter 2 stays opaque until the temperature Tc gets back to cold, and then returns to transparency.

Figure 2:
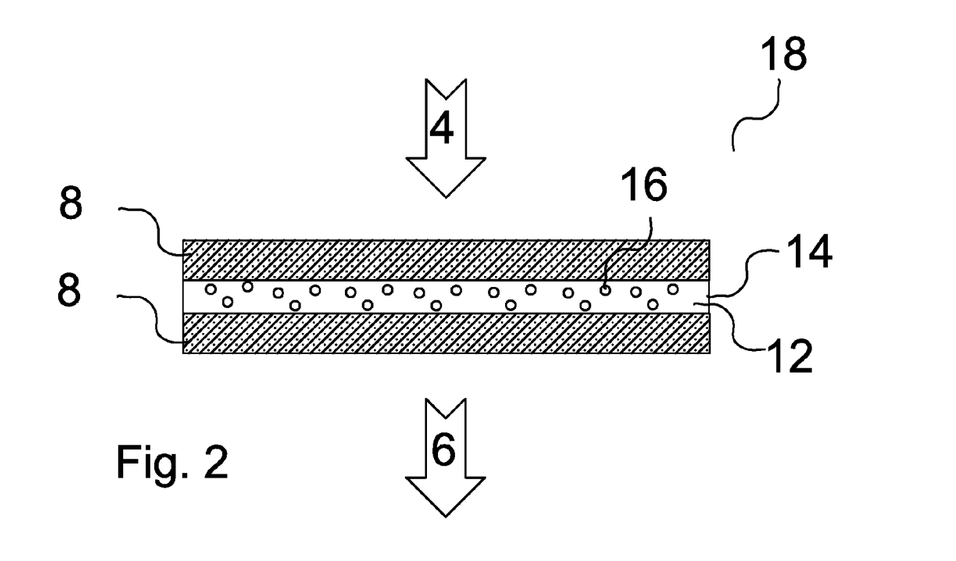
FIG. 2 depicts a cross-sectional view of a thermo-chromic nanoparticle matrix window-filter.

FIG. 2 depicts a cross-sectional view of a thermochromic nanoparticle matrix window-filter 18. Solar light 4 enters the filter 18 through a transparent plate of light transmitting material 8, e.g., glass slab, and impinges on a layer of TCC 14 containing nanoparticles of TC material 16 in a matrix 12. In case the material 16 is, e.g., $VO_2$, when the impingement spot is cold, less than Tc, the light passes through nearly unaffected in direction 6. When the impingement spot is hot, from Tc and up, the light is strongly affected; most of it is absorbed in the layer 14. The filter 18 stays opaque until the temperature gets back to cold, and then returns to transparency. Since Tc is affected by the size and volumetric arrangement of particles 16, this Tc temperature can be tuned in some narrow temperature range using various sizes, e.g., between about 1 to 100 nm, of nanoparticles and arranging them in the desired geometry.

Figure 3:
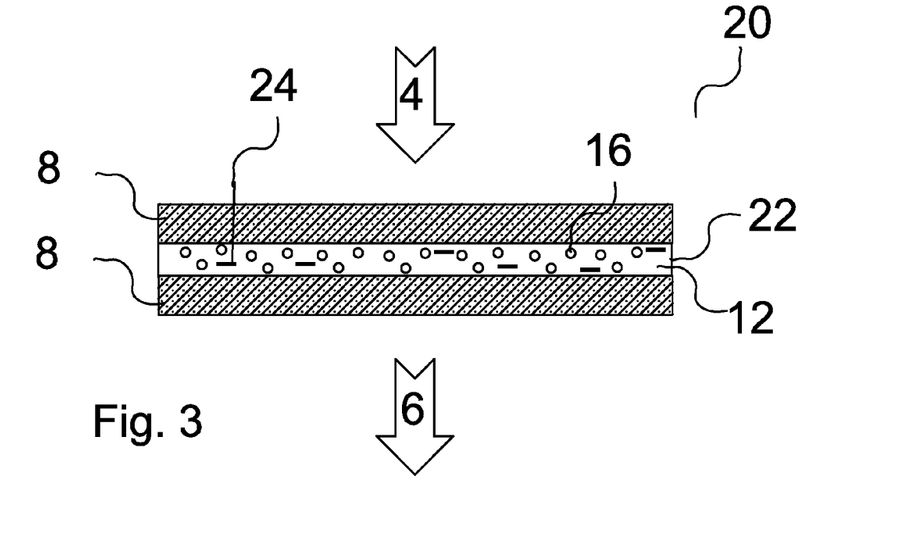
FIG. 3 depicts a cross-sectional view of a thermo-chromic and light absorbing nanoparticle matrix window-filter.

FIG. 3 depicts a cross-sectional view of a thermochromic and light absorbing nanoparticle matrix window-filter 20. Solar light 4 enters the filter 20 through a transparent plate of light transmitting material 8, e.g., glass slab, and impinges on a layer of TCC solid material 22. The TCC 22 contains two kinds of nanoparticles, embedded in a transparent matrix 12, where one kind of nanoparticle is thermochromic 16, e.g., $VO_2$ nanoparticles and the second kind 24 is light absorbing nanoparticles (about 1 to 100 nanometers in size) that exhibit strong absorption of the impinging light, e.g., carbon nanoparticles (about 1 to 100 nanometers in size). This combination will result in enhanced heating of the neighboring thermochromic particles 16 by the light absorbed by absorbing nanoparticles 24. The enhanced absorption, in the transparent case of the TCC will cause phase transformation in the TCC in lower impinging light intensity than needed for matrices including only thermochromic materials 16, thus enhancing the ability of the material to limit the amount of sun light transmitted through. In case the material 16 is, e.g., $VO_2$, when the impingement spot is cold, less than Tc, the light passes through nearly unaffected in direction 6. When the impingement spot is hot, from Tc and up, the light is strongly affected and most of it is absorbed in the layer 22. The filter 20 stays opaque until the temperature gets back to cold, and then returns to transparency.

Figure 4:
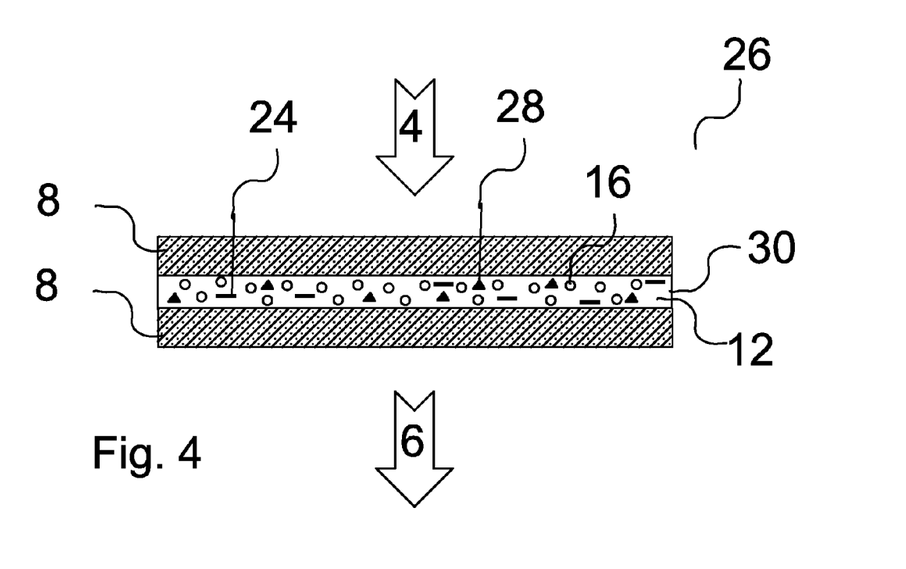
FIG. 4 depicts a cross-sectional view of a thermo-chromic, thermal conductivity and light absorbing nanoparticle matrix window-filter.

FIG. 4 depicts a cross-sectional view of a thermochromic, thermal conductivity and light absorbing nanoparticle matrix window-filter 26. Solar light 4 enters the filter 26 through a transparent plate of IR transmitting material 8, e.g., glass slab, and impinges on a layer of TCC solid material 30. The TCC 30 contains three kinds of nanoparticles, embedded in a transparent matrix 12, where one kind of nanoparticle is thermochromic 16, e.g., $VO_2$ nanoparticles (1 to 100 nanometers in size) and the second kind 24 is light absorbing nanoparticles (1 to 100 nanometers in size) that exhibit strong absorption of the impinging light, e.g., carbon nanoparticles. The third kind is nanoparticles that are thermal conductivity enhancers 28 (about 1 to 100 nanometers in size) intended to enhance the thermal conductivity of the matrix. The three component TCC compositions effectively achieve two purposes; one, heat that builds up in the optical element during the absorption of light can dissipate more easily to other elements in the system, effectively reducing the thermal degradation of both the matrix and the TCC matrix. Second, since most TC materials have a hysteresis behavior with a temperature range of up to tens of degrees between Tc of heating up and Tc of cooling down, removing the heat fast, by using thermal conductivity enhancers will reduce the recovery time to transparency after exposure to strong light. This combination will result in enhanced heating of the neighboring thermochromic particles 16 by the light absorbed by absorbing nanoparticles 24. The enhanced absorption, in the transparent case of the TCC 30 will cause phase transformation in the TCC 30 in lower impinging light intensity than needed for matrices including only thermo-chromic materials 16, thus enhancing the ability of the material to limit the amount of sun light transmitted through. In case the material 16 is, e.g., $VO_2$, when the impingement spot is cold, less than Tc, the light passes through nearly unaffected in direction 6. When the impingement spot is hot, from Tc and up, the light is strongly affected and most of it is absorbed in the layer 30. The filter 26 stays opaque until the temperature gets back to cold, and then returns to transparency. Particles 28, being thermal conductivity enhancers intended to enhance the thermal conductivity of the matrix, are bringing the TCC 30 back to transparency faster than without them. By tuning the TCC 30 composition between the three kinds of particles 16, 24, 28, an optimal design can be reached.

Figure 5:
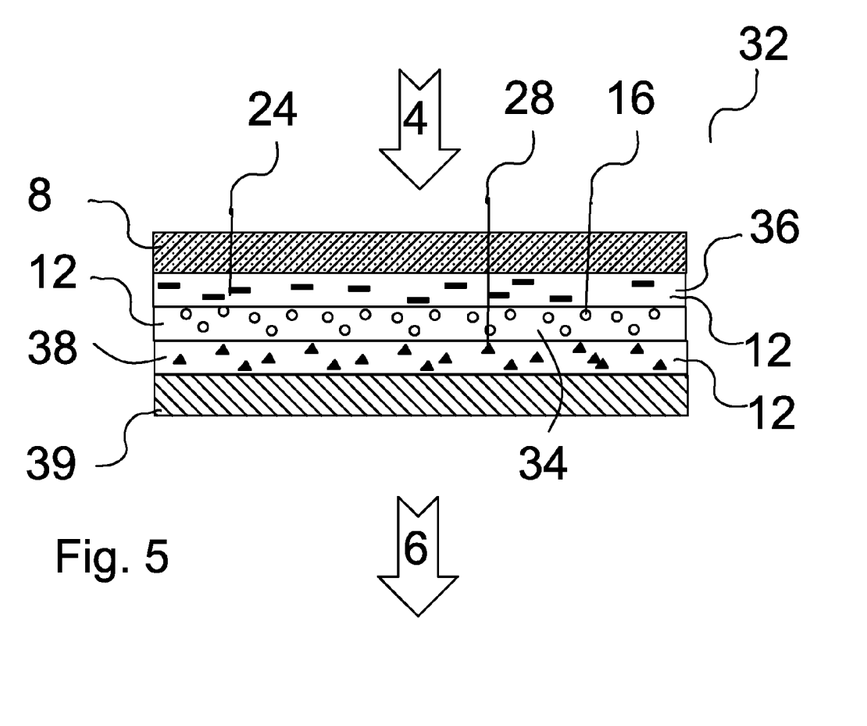
FIG. 5 depicts a cross-sectional view of a thermo-chromic, thermal conductivity and light absorbing nanoparticle matrix window-filter where each kind of particle is in a separate layer.

FIG. 5 depicts a cross-sectional view of a thermochromic, light absorbing and thermal conductivity nanoparticles matrix window-filter 32 where each kind of particle is located in a separate layer 34, 36 and 38, respectively. The layers are thin, in the order of 100 micrometers, and heat conduction between them is carried out through their common facets. Solar light 4 enters the filter 32 through a transparent plate of IR transmitting material 8, e.g., ZnSe or ZnS slab, and impinges on a layer of TCC solid materials 34, 36, 38. The TCC solid materials 34, 36, 38 contain three kinds of nanoparticles, each one embedded in its own transparent matrix 12, where one kind of nanoparticle, in layer 34, is thermochromic 16, e.g., $VO_2$ nanoparticles (1 to 100 nanometers in size). The second kind in layer 36 is light absorbing nanoparticles 24 (1 to 100 nanometers in size) that exhibit strong absorption of the impinging light, e.g., carbon nanoparticles, the third kind, in layer 38 is nanoparticles that are thermal conductivity enhancers 28 (1 to 100 nanometers in size) intended to enhance the thermal conductivity of the matrix. The three TCC layer composition effectively achieves two purposes; one, heat that builds up in the optical element during the absorption of light can dissipate more easily to other elements in the system, effectively reducing the thermal degradation of both the matrix and the TCC matrix layers. Second, since most TC materials have a hysteresis behavior with a temperature range of up to tens of degrees between Tc of heating up and Tc of cooling down, removing the heat fast, by using thermal conductivity enhancers will reduce the recovery time to transparency after exposure to strong light. This combination will result in enhanced heating of the neighboring thermochromic particles 16 by the light absorbed by layer 36 of absorbing nanoparticles. The enhanced absorption, in the transparent case of the TCC 32 will cause phase transformation in the TCC 32 in lower impinging light intensity than needed for matrices including only thermochromic materials 16, thus enhancing low light emitting objects in the field of view. In case the material 16 is, e.g., $VO_2$, when the impingement spot is cold, less than Tc, the light passes through nearly unaffected in direction 6. When the impingement spot is hot, from Tc and up, the light is strongly affected since most of it is absorbed by the filter 32, which stays opaque until the temperature reduces, and then returns to transparency. Particles 28, being thermal conductivity enhancers intended to enhance the thermal conductivity of the matrix, are bringing the TCC layer back to transparency faster than without them. By tuning the TCC 34, 36, 38 composition between the three kinds of particles 16, 24, 28 an optimal design can be reached. Additional cooling can be achieved by making the back plate 39 of heat conducting material, e.g., Sapphire or diamond. We note that the order in which layers 34, 36 and 38 are presented in FIG. 5 is only for the sake of example and other permutations (arrangements) of the layers 34, 36, 38 are also considered.

Figure 6:
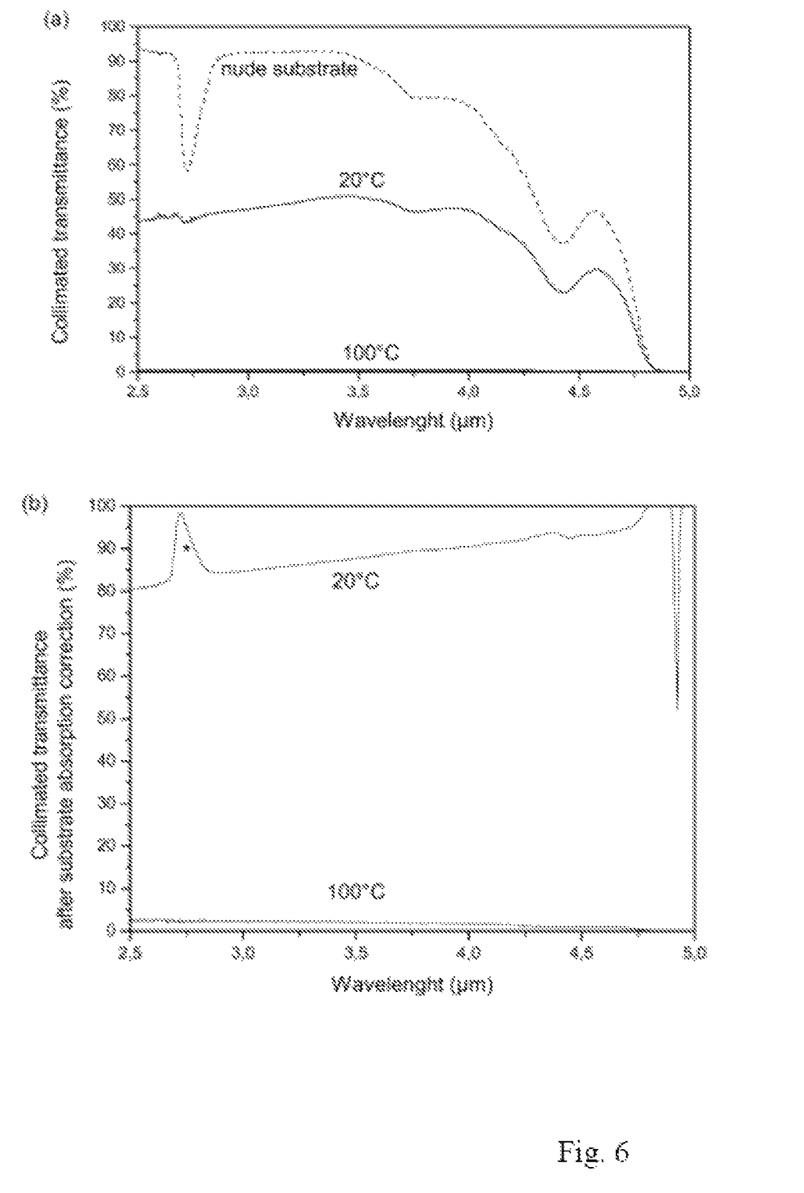
FIG. 6 shows an infrared transmission spectrum of $VO_2$ thin film below and above Tc.
Figure 7:
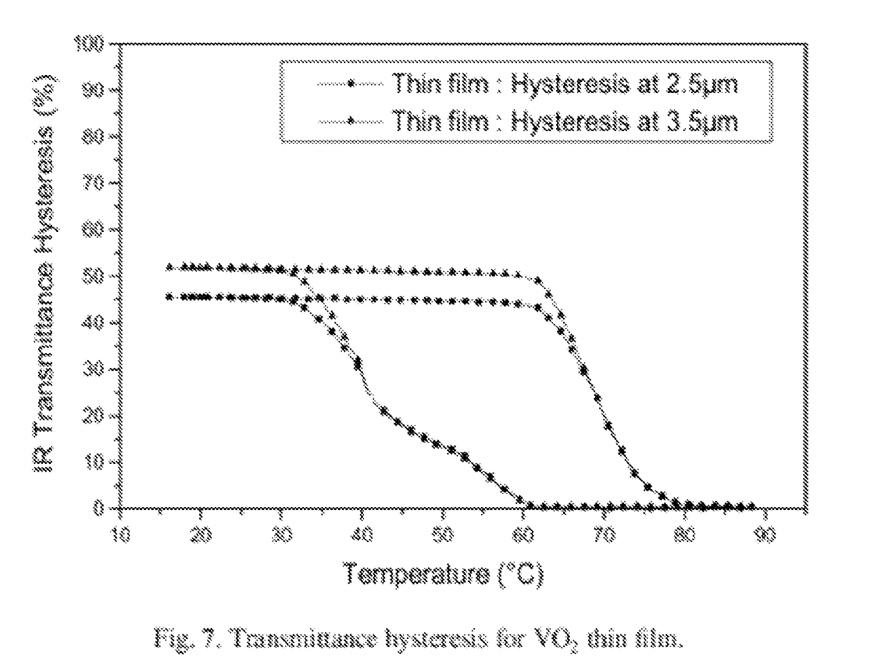
FIG. 7 shows a thermo chromic transition curve having a hysteresis.

FIGS. 6 and 7 show the thermochromic behavior of $VO_2$.

FIG. 6 shows an infrared transmission spectrum of $VO_2$ thin film below and above Tc. The curves show Fourier transform infrared transmittance spectrum for $VO_2$ thin film on amorphous silica in the 2.5 to 5 micrometer infrared transmittance spectrum for $VO_2$ thin film on amorphous silica after computational correction to remove the effects of substrate absorption. The curves depict the difference between the transparent and opaque states. FIG. 6 is cited from F. Guinneton et al., "Comparative study between nanocrystalline powder and thin film of vanadium dioxide $VO_2$: Electrical and infrared properties," Journal of Physics and Chemistry of solids 62, (201) 1229-1238.

FIG. 7 shows a thermochromic transition curve having a hysteresis. FIG. 7 is cited from F. Guinneton et al., "Comparative study between nanocrystalline powder and thin film of vanadium dioxide $VO_2$: electrical and infrared properties," Journal of Physics and Chemistry of Solids 62 (2001) 1229-1238. The curves on the right side show the transition when heating the sample, and on the left side when cooling the sample. There are two wavelengths at which measurements are carried out as depicted in the figure.

Figure 8A:
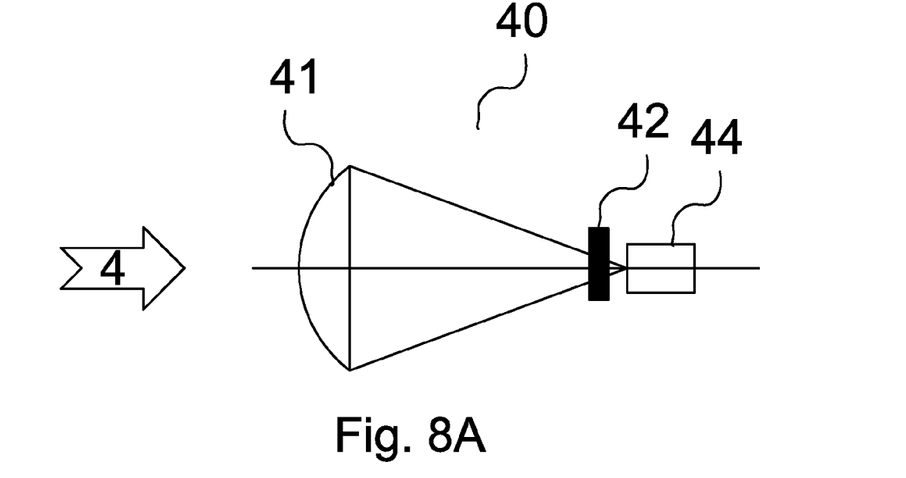
FIG. 8A depicts an example place for filter placement.
Figure 8B:
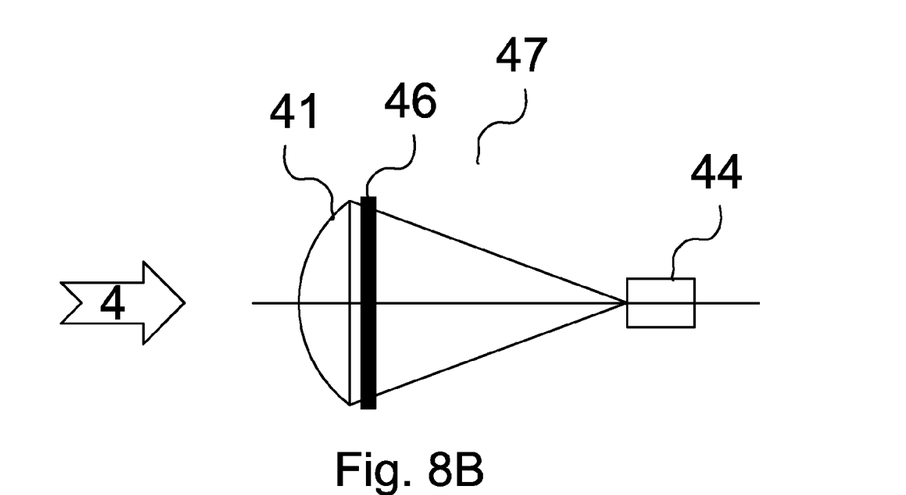
FIG. 8B depicts another example place for filter placement.

FIG. 8 depicts example locations for filter placement. In FIG. 8A, the placement geometry 40 shows the filter 42 near the focal location of lens or telescope 41, in front of the focal plane detector 44. In FIG. 8B, the placement geometry 46 shows the filter 48 at the back side of lens 41. In both cases the filters 42 and 48 shield the focal plane detector 44.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An optical window-filter comprising:
   a thermochromic material;
   a light absorbing material;
   wherein absorption of light by the light absorbing material generates heat that causes a phase transformation of the thermochromic material; and
   thermal conductivity enhancers that transfer heat from the light absorbing material to the thermochromic material and transfer heat away from the thermochromic material.

2. An optical window-filter comprising:
   a thermochromic material;
   a light absorbing material;
   wherein absorption of light by the light absorbing material generates heat that causes a phase transformation of the thermochromic material,
   wherein the thermochromic material includes thermochromic nanoparticles, and the light absorbing material includes light absorbing nanoparticles; and
   thermal conductivity enhancers that include thermal conductivity enhancing nanoparticles;
   wherein the thermochromic material forms a first layer, the light absorbing material forms a second layer, and the thermal conductivity enhancers form a third layer.

3. An optical window-filter comprising:
   a thermochromic material;
   a light absorbing material;
   wherein absorption of light by the light absorbing material generates heat that causes a phase transformation of the thermochromic material; and
   a first plate of light transmitting material and a second plate including heat conducting material, wherein the thermochromic material and the light absorbing material are positioned between the first plate and the second plate, wherein the light impinges at the first plate.

4. The optical window-filter of claim 3, wherein the heat conducting material includes Sapphire and/or diamond.

5. An optical window-filter comprising:
   a thermochromic material;
   a light absorbing material;
   wherein absorption of light by the light absorbing material generates heat that causes a phase transformation of the thermochromic material,
   wherein the thermochromic material includes thermochromic nanoparticles, and the light absorbing material includes light absorbing nanoparticles; and
   thermal conductivity enhancers that include thermal conductivity enhancing nanoparticles; and
   a first plate of light transmitting material and a second plate including heat conducting material, wherein the thermochromic material, the light absorbing material and the thermal conductivity enhancers are positioned between the first plate and the second plate, wherein the light impinges at the first plate.

6. The optical window-filter of claim 5, wherein the heat conducting material is Sapphire and/or diamond.

7. The optical window-filter of claim 5, wherein each of the thermochromic material, the light absorbing material and the thermal conductivity enhancers is positioned in a separate layer.

8. The optical window-filter of claim 5, wherein each of the thermochromic material, the light absorbing material and the thermal conductivity enhancers is positioned in a separate layer.

9. An optical window-filter for an infrared imaging system having detectors sensitive to radiation in an infrared transmission spectrum, said window-filter comprising:
   a reversible-phase thermochromic material and a light-absorbing material, wherein an absorption by said light-absorbing material of radiation, in said infrared transmission spectrum, having sufficient power to generate heat that causes a reversible phase transformation of said thermochromic material to attenuate said radiation while transmitting substantially unaffected lower-power radiation in said infrared transmission spectrum.

10. The optical window-filter of claim 9, wherein the thermochromic material includes thermochromic nanoparticles, and the light absorbing material includes light absorbing nanoparticles.

11. The optical window-filter of claim 9, further comprising thermal conductivity enhancers that transfer heat from the light absorbing material to the thermochromic material and transfer heat away from the thermochromic material.

12. The optical window-filter of claim 9, further comprising thermal conductivity enhancers that include thermal conductivity enhancing nanoparticles.

13. The optical window-filter of claim 9, further comprising: at least one plate of transparent material adjacent the thermochromic material and the light absorbing material.

14. The optical window-filter of claim 9 further comprising: two plates of light transmitting material; wherein the thermochromic material and the light absorbing material are located between the two plates of light transmitting material.

15. The optical window-filter of claim 9 further comprising: two plates of infrared transmitting material; wherein the thermo-chromic material, the light absorbing material, and the thermal conductivity enhancers are located between the two plates of infrared transmitting material.

16. The optical window-filter of claim 9, wherein the thermochromic material forms a first layer, and the light absorbing material forms a second layer, the first layer being adjacent to and in contact with the second layer.

17. The optical window-filter of claim 9, wherein the thermochromic material forms a first layer, the light absorbing material forms a second layer, and the thermal conductivity enhancers form a third layer.

18. The optical window-filter of claim 9, further comprising a first plate of light transmitting material and a second plate including heat conducting material, wherein the thermochromic material and the light absorbing material are positioned between the first plate and the second plate, wherein the light impinges at the first plate.

19. The optical window-filter of claim 9, wherein the heat conducting material includes Sapphire and/or diamond.

20. The optical window-filter of claim 9, wherein if a temperature of a location where the light impinges the layer including the thermochromic material does not have sufficient power to generate heat that causes a reversible phase transformation of the thermochromic material, the light passes through the filter without affecting a transparency of the filter.

21. The optical window-filter of claim 9, wherein if a temperature of a location where the light impinges the layer including the thermochromic material has sufficient power to generate heat that causes a reversible phase transformation of said thermochromic material, a majority of the light is absorbed in the layer including the thermochromic material and the filter turns opaque.

22. The window-filter of claim 21, wherein the filter remains opaque until the temperature of a location where the light impinges the layer including the thermochromic material falls to a temperature below the transition temperature of the thermochromic material.

23. The optical window-filter of claim 12, further comprising a first plate of light transmitting material and a second plate including heat conducting material, wherein the thermochromic material, the light absorbing material and the thermal conductivity enhancers are positioned between the first plate and the second plate, wherein the light impinges at the first plate.

24. The optical window-filter of claim 23, wherein the heat conducting material is Sapphire and/or diamond.

25. The optical window-filter of claim 9, wherein if a temperature of a location where the light impinges the layer including the thermochromic material has sufficient power to generate heat that causes a reversible phase transformation of said thermochromic material, a majority of the light is absorbed in the layer including the thermochromic material, and the filter turns opaque and remains opaque until the temperature is reduced to below the transition temperature of the thermochromic material.

26. The filter of claim 9 in which said high-power radiation occurs in only portions of the image.

27. The window-filter of claim 9 when used to reduce infrared radiation to any cavity or volume when heated sufficiently to cause a reversible phase transformation of the thermochromic material, turns opaque and remains opaque until the temperature is reduced sufficiently to reverse the phase transformation of the thermochromic material.

* * * * *